United States Patent
Tsutsumi et al.

(10) Patent No.: US 7,193,975 B2
(45) Date of Patent: Mar. 20, 2007

(54) WIRELESS LAN BASE STATION CAPABLE OF CARRYING OUT AUTOMATIC MATCHING FOR RADIO CHANNELS

(75) Inventors: Takayuki Tsutsumi, Kawasaki (JP); Yoshikazu Kobayashi, Kawasaki (JP)

(73) Assignee: NEC Infrontia Corporation, Kanagawa (JP)

(*) Notice: Subject to any disclaimer, the term of this patent is extended or adjusted under 35 U.S.C. 154(b) by 1059 days.

(21) Appl. No.: 10/259,855

(22) Filed: Sep. 30, 2002

(65) Prior Publication Data
US 2003/0179734 A1    Sep. 25, 2003

(30) Foreign Application Priority Data
Mar. 22, 2002  (JP)  ............................. 2002-081350

(51) Int. Cl.
H04L 12/28    (2006.01)
G06F 15/177   (2006.01)

(52) U.S. Cl. .................. 370/254; 370/256; 709/220; 709/221; 709/222

(58) Field of Classification Search ................ 370/227, 370/229, 237, 238, 254–56, 328, 329, 338, 370/351–359; 709/220–222, 241; 455/433
See application file for complete search history.

(56) References Cited

U.S. PATENT DOCUMENTS

| 5,732,327 A | 3/1998 | Yoshimi et al. |
| 5,933,420 A * | 8/1999 | Jaszewski et al. .......... 370/329 |
| 6,744,740 B2 * | 6/2004 | Chen .......................... 370/255 |
| 6,947,768 B2 * | 9/2005 | Adachi et al. .............. 455/560 |

FOREIGN PATENT DOCUMENTS

| EP | 0 654 952 A2 | 5/1995 |
| JP | 4-133531 A | 5/1992 |
| JP | 7-508385 | 9/1995 |
| JP | 8-214363 A | 8/1996 |
| JP | 8-237728 A | 9/1996 |
| JP | 2002-51368 A | 2/2002 |

(Continued)

OTHER PUBLICATIONS

ANSI/IEEE Std 802.11, 1999 Edition, Part 11: Wireless LAN Medium Access Control (MAC) and Physical Layer (PHY) specifications, Chapter 7, Frame Formats.*

(Continued)

*Primary Examiner*—Seema S. Rao
*Assistant Examiner*—Mark A Mais
(74) *Attorney, Agent, or Firm*—Foley & Lardner LLP

(57) ABSTRACT

A wireless LAN base station scans frequency channels available for use in a wireless LAN, detects a beacon signal of a near-by wireless LAN base station, and thereby the number of the near-by base stations in the wireless LAN is notified. The notified number of the near-by base stations is recorded in a network table. A wireless LAN base station which should determine a radio channel in the next is determined, based on the recorded number of the near-by base stations, using a wireless LAN base station having a smaller number of the near-by base stations as the starting point of radio channel determining process, after the wireless LAN base station at the starting point determines a radio channel. By repeatedly carrying out the above-described operation, the radio channels of the whole wireless LAN are automatically determined.

13 Claims, 10 Drawing Sheets

FOREIGN PATENT DOCUMENTS

Figure 1:
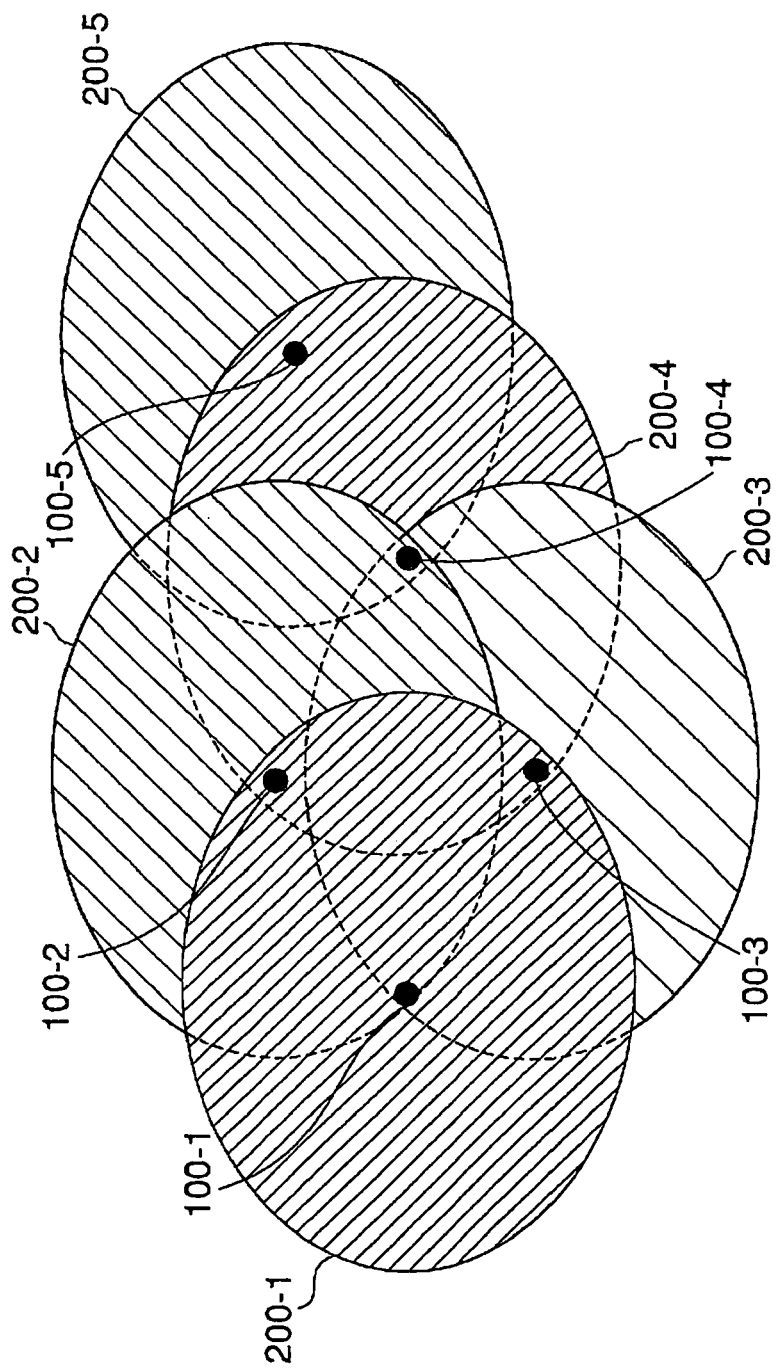

| | | |
|---|---|---|
| JP | 2002-204478 A | 7/2002 |
| WO | WO 94/00931 | 1/1994 |

OTHER PUBLICATIONS

IEEE Std 802.11a-1999 (R2003), Part 11: Wireless LAN Medium Access Control (MAC) and Physical Layer (PHY) specifications, High Speed Physical Layer in the 5 GHz Band, Chapter 7, Frame Formats.*

IEEE Std 802.11b-1999 (R2003), Part 11: Wireless LAN Medium Access Control (MAC) and Physical Layer (PHY) specifications, Higher Speed Physical Layer Extension in the 2.4 GHz Band, Section 4, Beacon Frame Format.*

IEEE Std 802.11e-2005, Part 11: Wireless LAN Medium Access Control (MAC) and Physical Layer (PHY) specifications, Amendment 8: Medium Access Control (MAC) Quality of Service Enhancements, Chapter 7, Frame Formats.*

* cited by examiner

FIG. 3

| | BASE STATION 100-1 | BASE STATION 100-2 | BASE STATION 100-3 | BASE STATION 100-4 | BASE STATION 100-5 |
|---|---|---|---|---|---|
| DETERMINING SEQUENCE | 4 | 3 | 5 | 2 | 1 |
| NEAR-BY BASE STATION | 2~T1 | 3~T2 | 3~T3 | 3~T4 | 1~T5 |
| MAC ADDRESS | A~T6 | B~T7 | C~T8 | D~T9 | E~T10 |
| SET-UP CHANNEL | 9~T11 | 6~T12 | 5,9,13~T13 | 1~T14 | START |
| DETERMINED RADIO CHANNEL | 13~T15 | 9~T16 | 1~T17 | 5~T18 | 1~T19 |

FIG. 8

| NEAR-BY BASE STATION TABLE 123 | MAC ADDRESS OF NEAR-BY BASE STATION | SSID VALUE Y1 | CHANNEL VALUE Y2 | RADIO WAVE INTENSITY Y3 | NUMBER OF NEAR-BY BASE STATIONS Y4 | CHANNEL DETERMINATION Y5 | MATCH-ING FINISH Y6 |
|---|---|---|---|---|---|---|---|
| MANAGE-MENT NO. | | | | | | | |
| 1 | MAC ADDRESS OF SELF BASE STATION | 10 | 1 | — | 2 | UNDETER-MINED 1 | UNFINI-SHED |
| 2 | xx-xx-xx-xx-xx-10 | 100 | 1 | STRONG | 1 | DETERMINED | UNFINI-SHED |
| 3 | xx-xx-xx-xx-xx-11 | 111 | 5 | WEAK | 3 | DETERMINED | UNFINI-SHED |

FIG. 9

| NETWORK TABLE 121 | | Y7 | Y8 | Y9 | Y11 | Y12 | Y13 | Y14 |
|---|---|---|---|---|---|---|---|---|
| MANAGE-MENT NO. | MAC ADDRESS | SSID VALUE | CHANNEL VALUE | RADIO WAVE INTENSITY | NUMBER OF NEAR-BY BASE STATIONS | JUDGEMENT OF NEAR-BY BASE STATION | CHANNEL DETERMINA-TION | MATCHING FINISH |
| 1 | MAC ADDRESS OF SELF BASE STATION | 10 | 1 | — | NEAR-BY | 2 | UNDETERMINED | UNFINISH-ED |
| 2 | xx-xx-xx-xx-xx-10 | 100 | 1 | STRONG | NEAR-BY | 1 | DETERMINED | UNFINISH-ED |
| 3 | xx-xx-xx-xx-xx-11 | 111 | 5 | WEAK | NEAR-BY | 3 | DETERMINED | UNFINISH-ED |
| 4 | xx-xx-xx-xx-xx-18 | 190 | 1 | — | — | 2 | UNDETERMINED | UNFINISH-ED |
| ... | ... | ... | ... | | | | ... | |

| DETERMINATING CHANNEL LIST 122 | DETERMINATING CHANNEL | CH1 | UNDETERMI-NED CH5-Y15 | UNDETERMI-NED CH9-Y16 | CH13 |

WIRELESS LAN BASE STATION CAPABLE OF CARRYING OUT AUTOMATIC MATCHING FOR RADIO CHANNELS

BACKGROUND OF THE INVENTION

The present invention relates to a wireless LAN (local area network) base station, and, more particularly, to a wireless LAN base station capable of carrying out automatic matching for radio channels.

As known, an LAN is a local network system for connecting a variety of computers such as a server, workstation, personal computer, or the like, dispersedly provided in a comparatively narrow area such as within the same building, within the same site, or the like, In the LAN, it is popularized in an application form in which one transmission medium is commonly used by a multiplicity of hosts. An MAC (media access control) is well known as transmission control technology essential for the LAN. The MAC is an access control for a plurality of nodes to smoothly and commonly use a local cable. The MAC is positioned at a lower sublayer of a data-link layer of OSI (open systems interconnection) model. The MAC cooperatively works with LLC (logical link control) of an upper sublayer of the data-link layer to realize a function of the data-link layer.

An MAC address is a standardized data link-layer address required for every port or device connected to the LAN. Another device in the network identifies the position of a specific port in the network by use of the address for creating and updating a routing table and data structure. The MAC address has 6 byte long and is defined by the IEEE (Institute of Electrical and Electronics Engineers). The MAC address is also known as a hardware address, MAC layer address, or physical address.

Moreover, the wireless LAN is an LAN using a transmission path such as an electromagnetic wave (radio wave), light (infrared ray), or the like, other than an electric wire (wire cable).

Normally, mobile radio communication employs a cell system. The cell system is a system in which a service area is divided into several areas (cells), each of the divided cells has a base station, and a plurality of the base stations cover whole service area. The cell system, in order to effectively use radio frequencies, uses radio channels of the same frequency between the cells maintaining a space which prevents from mutual interference or jamming. Accordingly, the cell system has a characteristic that the service area can be expanded even with limited frequency bands.

A telephone system by use of the wireless LAN comprises a main device, a plurality of wireless LAN base stations connected to the main device through a cable LAN, and a plurality of radio telephones for performing communication with the wireless LAN base stations through the wireless LAN. Each wireless LAN base station has an SSID (service set ID) as a zone identifier. The SSID is an arbitrary character string composed of 32 or less characters.

As a committee aiming at standardization of the wireless LAN, the IEEE 802.11 Committee is known. The IEEE 802.11 Committee stipulated the IEEE 802.11b as specifications for the standardized wireless LAN in September, 1999. According to the IEEE 802.11b, frequencies of 2.4 GHz band are used, and a spectrum diffusion communication direct diffusion system (SS-DS) is used for a modulation system. The SS-DS is the most popular system at the moment. Transmission rates thereof are 11 Mb/s and 5.5 Mb/s.

On the other hand, in Japan, the Wireless LAN Committee of the Telecommunications Technology Council submitted a report on the frequency bands and the like of the wireless LAN in July, 1992, and the Ministry of Posts and Telecommunications approved allocation of the radio wave. In other words. in Japan, for the wireless LAN of the frequencies of 2.4 GHz band stipulated by the IEEE 802.11b, radio channels of No. 1 to No. 14 CH (channel) can be provided using the frequencies from 2412 MHz to 2484 MHz in unit of 5 MHz.

However, as described above, in the IEEE 802.11b, radio signals are to be transmitted by use of the direct spectrum diffusion system as the modulation system, thus a frequency band of 20 MHz is required for one channel. Therefore, in order to make a channel not to be interfered by another channel, a frequency band enough for 4 channels is required.

Accordingly, each LAN base station requires setting of the radio channels by contriving such that interference with other channels may be avoided. However, when the radio network expands, the number of the wireless LAN base stations also increases, and therefore setting of the radio channels in each wireless LAN base station, while avoiding the interference, becomes difficult.

As a technical paper in association with the present invention, the official gazette of PCT Japanese Translation Patent Publication No. 7-508385 (hereinafter referred to as a technical document 1) is known. The technical document 1 discloses a radio frequency communication system having a plurality of transceivers operated by a variety of frequencies within a predetermined range. In particular, the technique disclosed in the technical document 1 provides a method for and a device of selecting an operating frequency, to be used in communication equipment which commences operation in the radio frequency communication system, from within the above-described predetermined range. For example, speaking of the method disclosed in the technical document 1, the communication equipment carries out the following operation. Namely, the communication equipment carries out a step of scanning a set of frequencies within the above-described predetermined range at an operating position thereof, a step of storing into a memory a table of information corresponding to a signal detected during the scanning, a step of checking out the number of interfering paths in association with respective scanning frequencies, and a step of selecting a frequency having the least number of the associated interfering paths from within the above-described predetermined range.

However, the technical document 1 only discloses the technique by which respective communication equipment can select a frequency having the least number of the interfering paths, and does not pay any consideration to the number of the near-by base stations. Necessity of the information regarding the number of the near-by base stations will become clearer with progress of the description.

SUMMARY OF THE INVENTION

An object of the present invention is to provide a wireless LAN base station capable of carrying out automatic matching for radio channels in a wireless LAN.

More in particular, the present invention automatically matches the radio channels when constructing a wireless LAN, or in an existing wireless LAN, thereby radio wave interference due to the use of a radio channel of near-by frequency may be prevented.

The wireless LAN base station according to the present invention is provided so as to have a wireless LAN constructed in each cell of a service area composed of a plurality of cells.

According to an aspect of the present invention, each wireless LAN base station performs active scanning stipulated by the IEEE 802.11 for a previously selected period of time, records in a network table the number of the near-by base stations from a beacon signal received by each frequency band, redefines the number of the near-by base stations in a reserve bit of capability information of the beacon signal transmitted by a self base station, and notifies of the number of the near-by base stations for a fixed period of time through a preset radio channel The wireless LAN base station may also be constructed such that radio wave intensity, radio channel, and MAC address of the received beacon signal are recorded in a near-by base station table, the reserve bit of the capability information is referred to, and the number of the near-by base stations is recorded in the near-by base station table.

Furthermore, the wireless LAN base station transmits the information of the near-by base station table to near-by wireless LAN base stations, and collects the number of the near-by base stations in the wireless LAN. The wireless LAN base station has a network table having the number of the near-by base stations collected in the wireless LAN recorded therein. In this case, the wireless LAN base station compares the number of the near-by base stations of respective wireless LAN base stations in the network table after elapsing a preset period of time, and when the wireless LAN base station having the minimum number of the near-by base stations is the self wireless LAN base station, the self wireless LAN base station may be determined to have a preset radio channel.

According to another aspect of the present invention, each wireless LAN base station has a wireless LAN interface circuit, a memory circuit, and a control circuit. The wireless LAN interface circuit includes a radio antenna, a beacon signal detecting circuit for detecting a beacon signal from a signal received by the radio antenna, a radio wave intensity detecting circuit for detecting the radio wave intensity of the detected beacon signal, and a radio frequency changing circuit for switching transmitting/receiving frequency of the radio antenna. The control circuit not only stores in the memory circuit the information obtained from the detected beacon signal and the data of radio channel determination notice to be notified by the near-by wireless LAN base stations, but also determines a radio channel to be used by the self station from the information stored in the memory circuit.

A method of automatic matching for radio channels according to the present invention is applied to a wireless LAN in which wireless LAN base stations are provided in each of cells of a service area composed of a plurality of cells.

According to an aspect of the present invention, the method of automatic matching for radio channels includes a step of scanning a frequency channel usable in a wireless LAN to detect a beacon signal of the near-by wireless LAN base stations, and then notifying of the number of near-by base stations in the wireless LAN, a step of recording the notified number of the near-by base stations in the network table, and a step of determining a wireless LAN base station which should determine a radio channel in the next, based on the recorded number of the near-by base stations, using a wireless LAN base station having a smaller number of the near-by base stations as the starting point of radio channel determining process, after the wireless LAN base station at the starting point determines a radio channel. Repetitively carrying out the above-described steps determines the radio channels of the whole wireless LAN.

BRIEF DESCRIPTION OF THE INVENTION

Figure 2:
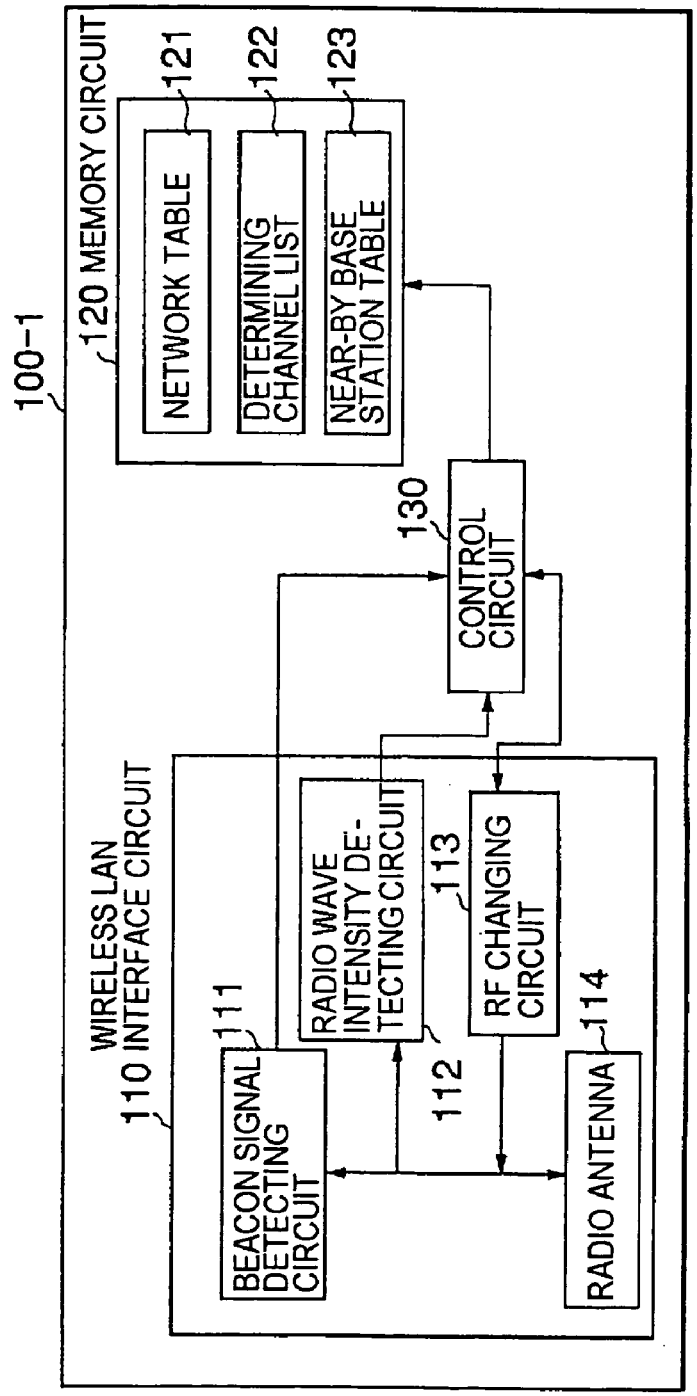
Figure 4:
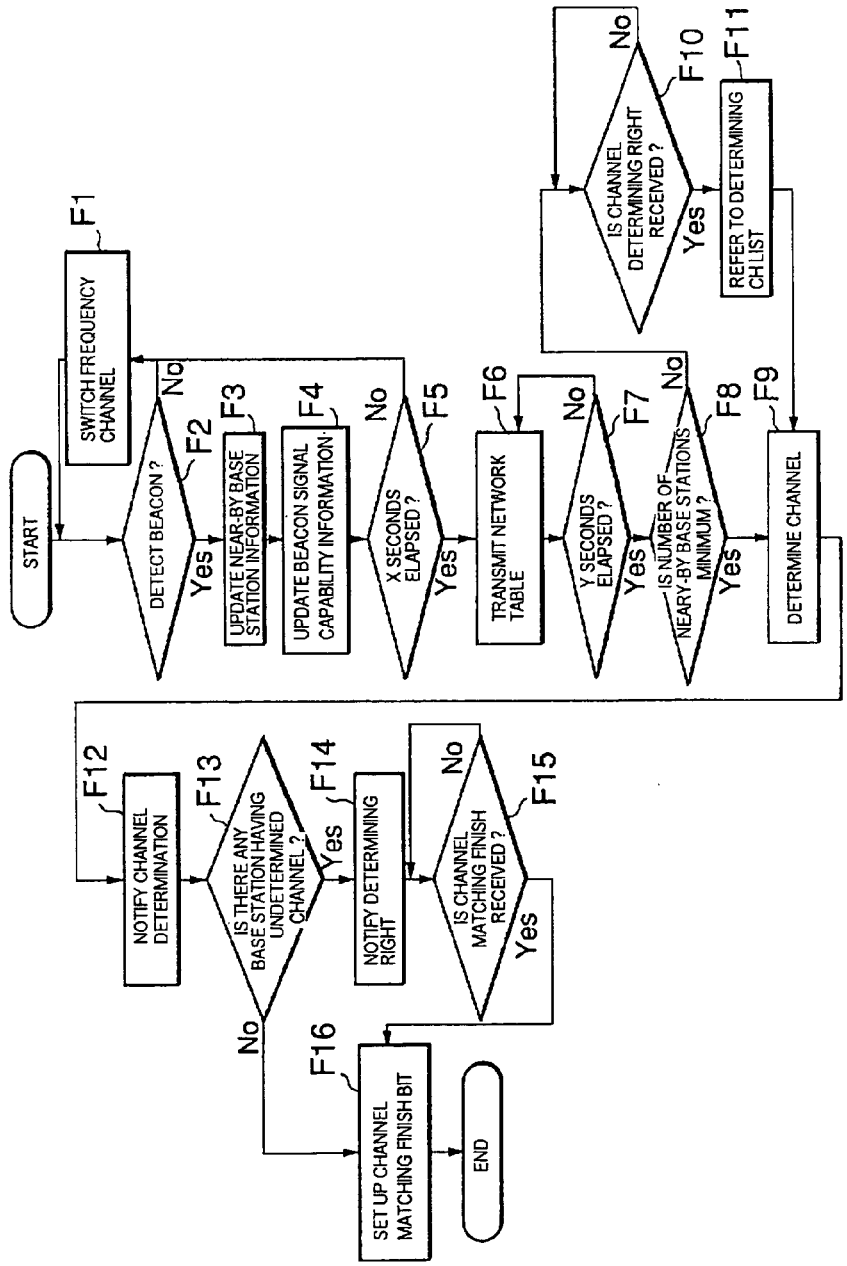
Figure 5:
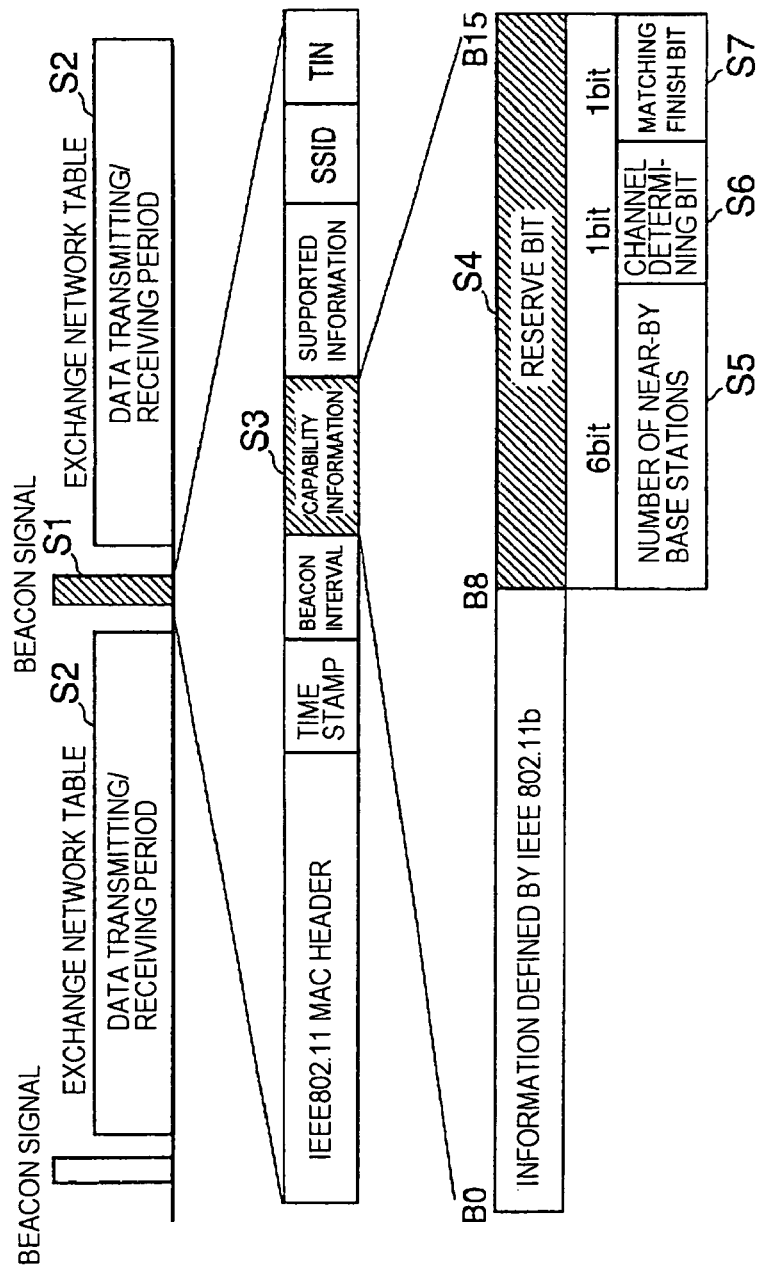
Figure 6:
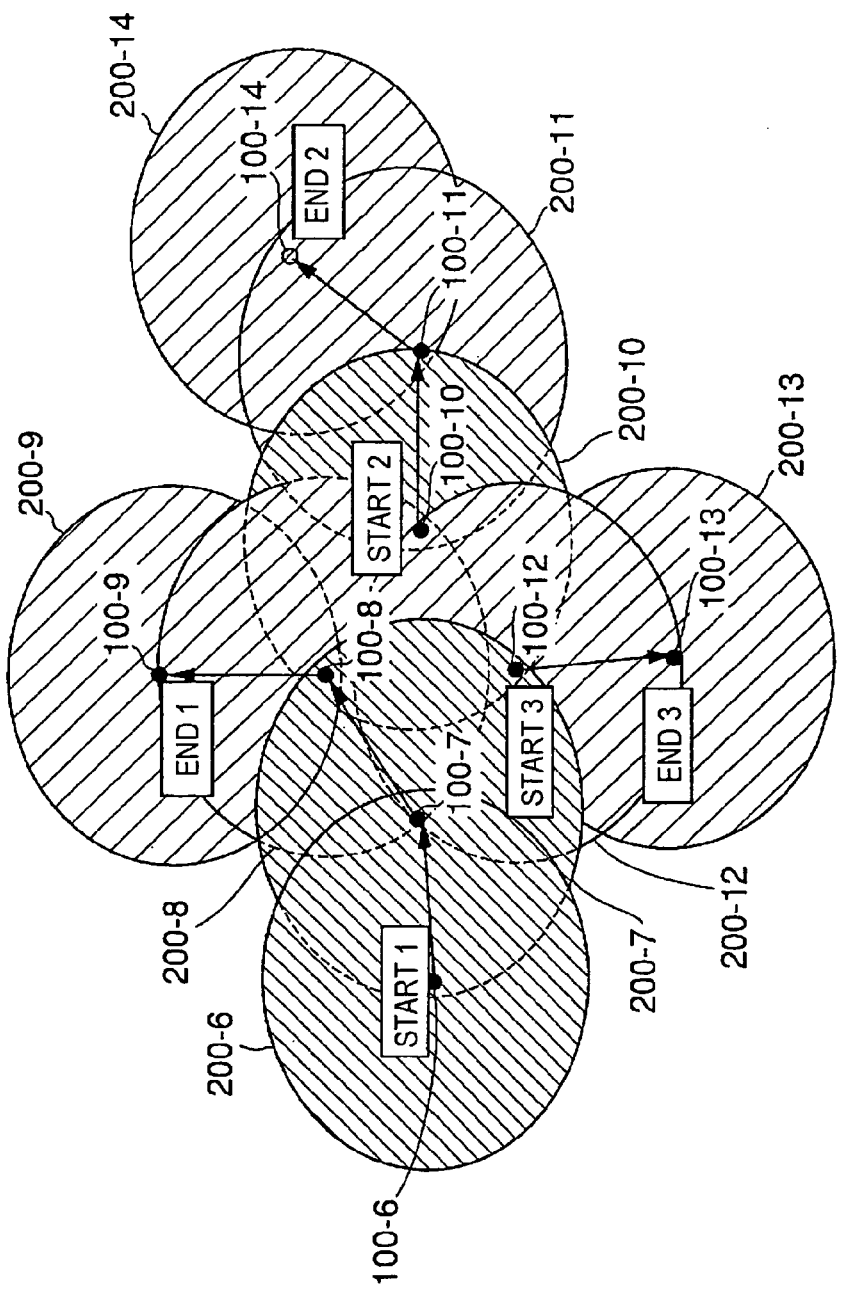
Figure 7:
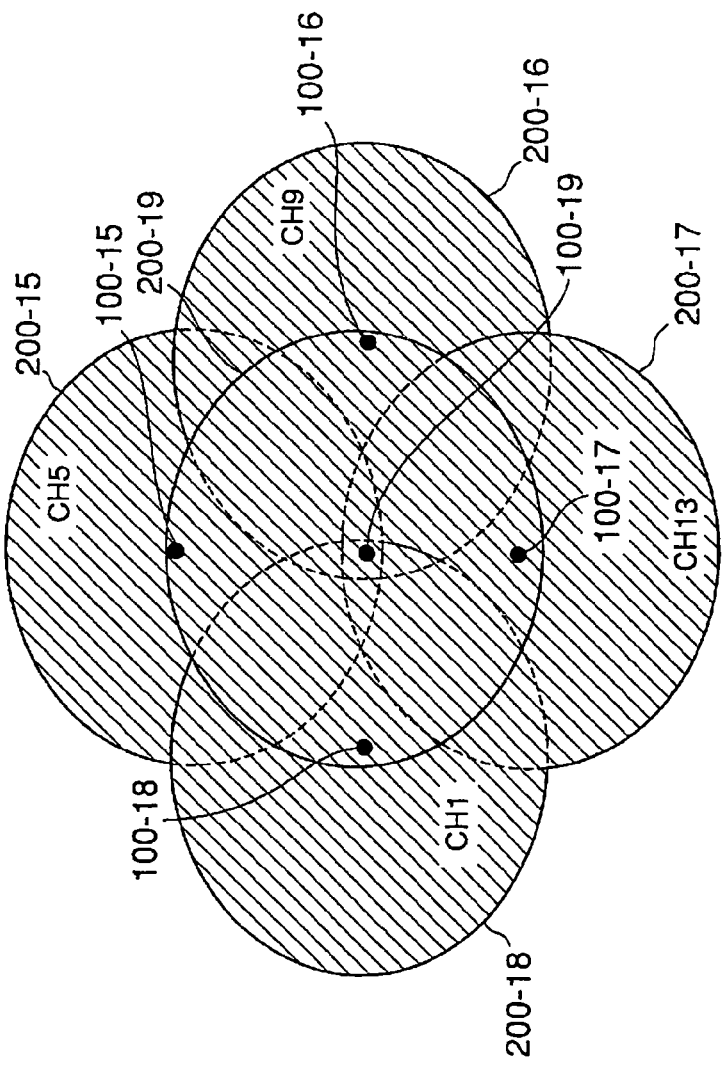
Figures 10, 11:
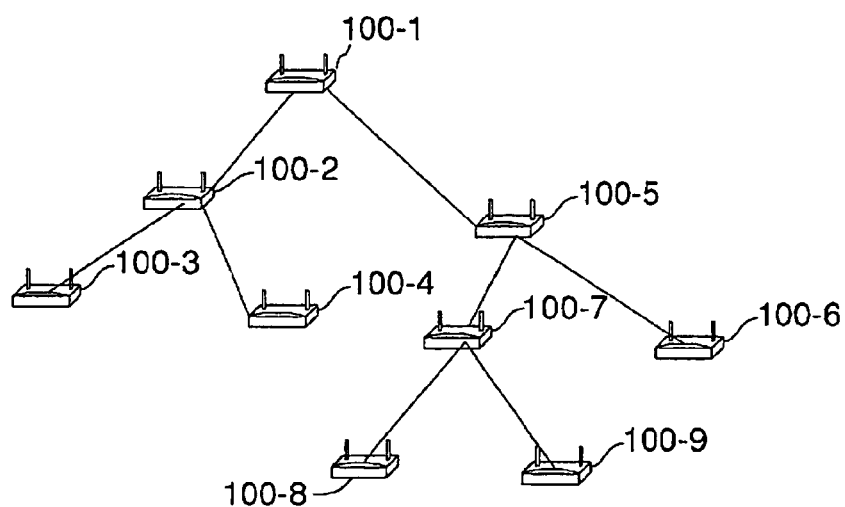

FIG. 1 is a diagram showing an example of a first structure of a wireless LAN to which the present invention is applied, FIG. 2 is a block diagram showing an example of a structure of a wireless LAN base station according to the present invention, FIG. 3 is a table for explaining a method of automatic matching for radio channels to be carried out in the wireless LAN base station according to the present invention, FIG. 4 is a flowchart for explaining the method of automatic matching for radio channels to be carried out in the wireless LAN base station according to the present invention, FIG. 5 is a diagram for explaining a beacon signal to be used in the wireless LAN base station according to the present invention, FIG. 6 is a diagram showing an example of a second structure of the wireless LAN to which the present invention is applied, FIG. 7 is a diagram showing an example of a third structure of the wireless LAN to which the present invention is applied, FIG. 8 is a table showing an example of a near-by base station table to be provided at the wireless LAN base station shown in FIG. 2, FIG. 9 is a table showing an example of a network table to be provided at the wireless LAN base station shown in FIG. 2, FIG. 10 is a table showing an example of a determining channel list to be provided at the wireless LAN base station shown in FIG. 2, and FIG. 11 is a chart for explaining tool topology to be used in the present invention.

DESCRIPTION OF THE PREFERRED EMBODIMENT

Referring to FIG. 1, description will be made about a first example of a wireless LAN to which the present invention is applied. FIG. 1 is a diagram showing cells, which are radio service range of wireless LAN base stations (hereinafter referred to as base stations), and a wireless LAN. A cell has a certain range, and within the range, a frequency band (channel) to use is determined. As shown in FIG. 1, each cell has one base station. In the example shown in FIG. 1, a service area is divided into five cells, namely a first to fifth cells 200-1 to 200-5. The respective cells, namely the first to fifth cells 200-1 to 200-5, have base stations, namely, a first to fifth base stations 100-1 to 100-5, respectively.

Referring to FIG. 2, structure of the base station according to the present invention will be described. Here, the structure of the first base station 100-1 is described, but the structures of other base stations, namely the second to fifth base stations 100-2 to 100-5, are completely the same, The first base station 100-1 has a wireless LAN interface circuit 110, a memory circuit 120, and a control circuit 130.

The wireless LAN interface circuit 110 has a beacon signal detecting circuit 111, a radio wave intensity detecting circuit 112, a radio frequency changing circuit 113, and a radio antenna 114. The beacon signal detecting circuit 111 refers to a header of a signal received by the radio antenna 114 and detects a beacon signal. The radio wave intensity detecting circuit 112 detects radio wave intensity of the signal received by the radio antenna 114 and transmits the detected data to the control circuit 130. The radio frequency changing circuit 113 changes transmitting/receiving frequency of the radio antenna 114.

The memory circuit 120 has a network table 121, a determining channel list 122, and a near-by base station table 123.

The control circuit 130 transmits the information obtained from the detected beacon signal and the data of radio channel determination notice to be notified from the near-by base stations to the memory circuit 120, and determines a radio channel to be used by the self base station from the information of the memory circuit 120.

Next an operation of the base station will be described.

As shown in FIG. 1, the first to fifth cells 200-1 to 200-5 are provided in a form overlapping each other. The first to fifth base stations 100-1 to 100-5 provided in such first to fifth cells 200-1 to 200-5 count the number of near-by base stations, respectively. Each of the first to fifth base stations 100-1 to 100-5 loads the counted number of the near-by base stations on the beacon signal, and notifies the near-by base stations of the number through previously set radio channels for a fixed period of time.

Each base station receives beacon signals from neighboring base stations, detects the radio wave intensity, radio channel, MAC address, and the number of near-by base stations, and records them in the near-by base station table 123.

The present invention is, as described hereinafter, to automatically match the radio channels (radio bands) to use by use of the near-by base station table 123.

Referring to FIGS. 1 to 5, description will be made about the method of automatic matching for radio channels according to the present invention.

FIG. 5 shows a format of a radio signal which is transmitted/received between the base stations. The radio signal includes a beacon signal S1, and between neighboring two beacon signals S1, a data transmitting/receiving period S2 is provided. The beacon signal S1 comprises an IEEE 802.11 MAC header, time stamp, beacon interval, capability information S3, supported information, SSID (base station zone identifier), and TIM.

The capability information S3 comprises the information defined by the IEEE 802.11b, and a reserve bit S4. If an example is described, the reserve bit S4 is allocated with the number of the near-by base stations S5 of 6 bits, a channel determining bit S6 of 1 bit, and matching finish bit S7 of 1 bit.

Each of the first to fifth base stations 100-1 to 100-5 detects the beacon signal while changing the radio channels (F1, and F2 in FIG. 4) (first means).

In case of the first base station 100-1, since its near-by base stations are the second base station 100-2 and third base station 100-3, the number of the near-by base stations is 2 (T1 in FIG. 3). The first base station 100-1 defines this number of the near-by base stations in the reserve bit S4 of the capability information S3 of the beacon signal S1 (S5 in FIG. 5, F4 in FIG. 4) (third means).

Each base station receives the beacon signal S1 including such number of the near-by base stations S5, and records the number of the near-by base stations of the each base station in the network table 121 (second means).

In case of the first base station 100-1, that the second base station 100-2 has the number of 3 as the number of the near-by base stations (T2 in FIG. 3) is read out from the beacon signal S1 from the second base station 100-2, and that the third base station 100-3 has the number of 3 as the number of the near-by base stations (T3 in FIG. 3) is read out from the beacon signal S1 from the third base station 100-3.

It should be noted that each base station transmits the content of the network table 121 to the near-by base stations during the data transmitting/receiving period (S2 in FIG. 5) between the beacon signals (F6 in FIG. 4). This operation is repeated, and respective base stations record the numbers of the near-by base stations of all base stations in the network table 121.

After a preset period of time (Y second) is elapsed (F7 in FIG. 4), respective base stations refer to the network table 121 and compare the numbers of the near-by base stations of the respective base stations (F8 in FIG. 4) (ninth means). When the result of the comparison reveals that the base station having the least number of the near-by base stations is the self base station, the self base station is determined to have a preset radio channel (F9 in FIG. 4) (tenth means). In FIG. 1, the fifth base station 100-5 corresponds to the base station having the least number of the near-by base stations, and it is set to have the channel CH1 by T19 in FIG. 3.

As the result of the comparison, when a plurality of the base stations have the same least number of the near-by base stations, the base station having a larger radio wave intensity determines the radio channel (eleventh means). When the radio wave intensity is also coincided in addition to the least number of the near-by base stations, the base station having a smaller MAC address determines the radio channel (twelfth means).

Moreover, the base station determined the radio channel (fifth base station 100-5 in FIG. 1) defines a channel determining bit in the reserve bit S4 of the capability information S3 of the beacon signal S1 (S6 in FIG. 5), and notifies the near-by base stations of the definition (F12 in FIG. 4) (fifteenth means), In the case of FIG. 1, the fifth base station 100-5 notifies the fourth base station 100-4 that the radio channel is determined. Furthermore, each base station refers to the near-by base station table 123, and notifies one of the near-by base stations having the smaller number of the near-by base stations of the channel determining right (F14 in FIG. 4) (sixteenth means). In the cases of FIGS. 1 and 3, the fourth base station 100-4 has the next radio channel determining right. The fourth base station 100-4 determines the channel CH5, and notifies the second base station 100-2 of the radio channel determining right.

When the channel determining bit is detected in the received beacon signal S1 (S6 in FIG. 5), each base station creates a determining channel list 122 having the determined radio channel and the MAC address of the beacon signal S1 written therein (nineteenth means).

The base station which received the channel determining right notice (F10 in FIG. 4) refers to the determining channel list 122 (F11 in FIG. 4), determines a radio channel which is not coincided on the determining channel list 122 (F12 in FIG. 4) (twentieth means), and sets the channel determining bit S6, in the same manner as above-described, and the channel determining right is notified (F14 in FIG. 4) (twenty-first means).

When the channel determining bits S6 are set in the beacon signals S1 from all near-by base stations, and the self base station also sets the radio channel determining bit (No at F13 in FIG. 4), the pertinent base station sets a matching finish bit in the beacon signal S1 (S7 in FIG. 5) and terminates the automatic matching of the channels (F16 in FIG. 4) (twenty-second means).

When the channel determining bit (S6 in FIG. 5) is detected and the matching finish bit (S7 in FIG. 5) is set in the received beacon signal S1, and when the self base station is undetermined of the radio channel, a radio channel which is not coincided on the determining channel list 122 is set, and using this base station as the starting point, channel matching process of base stations where the channel determining bit S6 is unset is started.

Next, description will be made about a second example of the wireless LAN to which the present invention is applied. The wireless LAN has a plurality of base stations having the least number of the near-by base stations. The wireless LAN shown in FIG. 6 has a service area composed of sixth to fourteenth cells 200-6 to 200-14. The sixth to fourteenth cells 200-6 to 100-14 have the sixth to fourteenth base stations 100-6 to 100-14, respectively.

For such wireless LAN, automatic matching of the radio channels is carried out as described hereinafter.

When the automatic matching of the radio channels is started from Start 1 in FIG. 6 and the radio channels to End 1 are determined by the procedure described with the first example, a matching finish bit S7 is set in the ninth base station 100-9 in FIG. 6. The matching finish bit S7 is transferred to the eighth base station 100-8, to the seventh base station 100-7, and then to the sixth base station 100-6. At this time, the tenth base station 100-10 and twelfth base station 100-12 are undetermined of the radio channels.

When the matching finish bits S7 contained in the beacon signals S1 of the eighth base station 100-8 and seventh base station 1007 are detected, the tenth base station 100-10 and twelfth base station 100-12 retrieve, for a predetermined period of time, the beacon signals S1 of the near-by base stations (tenth to fourteenth base stations 100-10 to 100-14) in which the radio channels are undetermined, and if the automatic matching of the radio channels has not yet been restarted, the automatic matching is restarted. In the case of FIG. 6, the tenth base station 100-10 which received the matching finish bit S7 earlier than the twelfth base station 100-12 becomes the restarting point 2.

The tenth base station 100-10 restarts the automatic matching of the radio channels, and notifies either of the eleventh base station 100-11 or twelfth base station 100-12 whichever has a smaller MAC address of the channel determining right. In FIG. 6, the tenth base station 100-10 notifies the eleventh base station 100-11 of the channel determining right.

Thereafter, the same operation is repeated.

Now, referring to FIG. 7, description will be made about the third example of the wireless LAN to which the present invention is applied. In this wireless LAN, the number of near-by base stations of a base station exceeds the number of channels which are not overlapped in the whole service area and are available for use. In other words, the service area has fifteenth to nineteenth cells 200-15 to 200-19. The fifteenth to nineteenth cells 200-15 to 200-19 have fifteenth to nineteenth base stations 100-15 to 100-19, respectively. The nineteenth cell 200-19 overlaps the fifteenth to eighteenth cells 200-15 to 200-18. The fifteenth base station 100-15 has a channel CH5, and the sixteenth base station 100-16 has a channel CH9. On the other hand, the seventeenth base station 100-17 has a channel CH13, and the eighteenth base station 100-18 has a channel CH1. In this case, the nineteenth base station 100-19 is in a waiting mode.

FIG. 8 shows an example of the near-by base station table 123 of the memory circuit 120. The near-by base station table 123 has columns of SSID value Y1, channel value Y2, the radio wave intensity Y3, the number of near-by base stations Y4, channel determination Y5, and matching finish Y6 for each MAC address of the near-by base stations.

FIG. 9 shows an example of the network table 121 of the memory circuit 120. The network table 121 has columns of SSID value Y7, channel value Y8, the radio wave intensity Y9, near-by base station judgement Y11, the number of the near-by base stations Y12, channel determination Y13, and matching finish Y14 for each MAC address of the near-by base stations.

FIG. 10 shows an example of the determining channel list 122 of the memory circuit 120.

A base station is presumed to have an Ethernet (registered trade mark) interface and is connected to the LAN, In this case, the base station sums up the numbers of the SSID (base station zone identifier) values from the received beacon signals S1 (thirteenth means). The base station makes the summed up number of the SSID values as the number of the near-by base stations (fourteenth means), and creates tree topology of the near-by base stations by use of the numbers of the near-by base stations (refer FIG. 11) by tree structure of a spanning tree (seventeenth means). Then, the automatic matching for the radio channels is carried out by a method of notifying a near-by base station having the youngest MAC address among the MAC addresses at the tip end of the spanning tree about the above-described channel determination (eighteenth means).

Here, the spanning tree is one of the control methods for preventing eternal circulation of data in a network formed in a loop-shape, and is standardized as the IEEE 802.1d. In the spanning tree, pieces of control information called BPDU (Bridge Protocol Data Unit) are exchanged between bridges, based on the given priority sequence, to set one path for ordinary use, and the other paths are set as bypasses for the time of fault. By this arrangement, even with a network having a loop physically formed thereon, a situation that the data continuously rotates in the loop can be prevented. The spanning tree can be adjusted only by being replaced with a type of device corresponded with the bridge, while the loop is to be eliminated by reassembling the network. The spanning tree also has an advantage that a bypass can be secured at the time of fault. Therefore, it has been thought to be advantageous to constitute a spanning tree particularly when a large-scale network is formed.

Now, a first embodiment of the method of automatic matching for radio channels by a base station according to the present invention will be described in detail.

The base station performs an active scanning stipulated by the IEEE 802.11 for a previously selected period of time (F1 in FIG. 4) (first means), and records in a near-by base station table 123 a sender's MAC address, SSID value, and channel value from beacon signals S1 received by respective frequency bands. In continuation, the base station sums up the number of pieces of the SSID value on the near-by base station table 123, or the number of MAC addresses or the number of SSID values of the base stations transmitting the beacon signals S1, and stores the summed up number in the network table 121 as the number of near-by base stations (second means).

The base station redefines the number of the near-by base stations S5 in the reserve bit S4 of the capability information S3 of the beacon signal S1 transmitted by the self base station (third means), and notifies the number of the redefined near-by base stations through the preset radio channel S2 in accordance with the preset procedure (fourth means). The preset procedure uses, for example, all the reserve bits as binary values, thereby the number of the base stations located in the vicinity of the base station which transmitted the beacon signal S1 can be automatically judged.

As an application in the industry, when received number of the base stations is larger than a present value (for example, 4), channel setting of the base stations with intervals of three channels in-between such as channel 1, channel 5, channel 9, and channel 13 according to the IEEE 802.11 becomes impossible. In this case, an alarm may be transmitted.

Moreover, transmission of the number of the base stations may be made not only to the wireless LAN, but also to the cable LAN. Insertion position of the number of the near-by base stations S5 is not limited to the reserve bit S4 in the beacon signal S1, and it may be transmitted to another position or by a communication frame by a preset specific header.

In preparation for a collision occurring in a receiving channel, each base station may have a means for automatically switching to an empty channel. For example, while a base station is using the channel CH5, if the channel CH5 receives another beacon signal S1 with "strong" radio wave intensity, the initially set channel CH5 of the self base station may be automatically switched to the channel CH 9 to activate.

Now, a second embodiment of the method of automatic matching for radio channels by a base station according to the present invention will be described.

The base station records the radio wave intensity, radio channel, and MAC address of the received beacon signal S1 in the near-by base station table 123 of the memory circuit 120 by each SSID (base station zone identifier) value of the beacon signal S1 (fifth means). The base station refers to the reserve bit S4 of the capability information S3, and stores the number of the near-by base stations S5 in the near-by base station table 123 (sixth means).

As an application in the industry, the base station checks the radio wave intensity of respective base stations, when the number of the near-by base stations S5 exceeds 4. The base station judges that the numbers of the radio channels are crowded when more than the preset number of the near-by base stations is received by strong radio wave intensity (for example, when three or more near-by base stations are received with the strong radio wave intensity), and switches the self base station to the waiting mode which only receives the beacon signal S1, and automatically enters into a waiting state.

In entering the waiting state, the base station may assemble a system operation such that the information of the near-by base station table 123 is notified to a device by the preset communication frame of the LAN, and the notified device is inquired whether entering into the waiting state or not.

When already in a sleep state and the number of the beacon signals is reduced to be the receiving number of the beacon signals of the predetermined base station, or less, the base station may automatically release the sleep state to return to the communication state.

When making power source, the base station scans the beacon signal S1 for a period of the sleep time previously set by a random number, and when the number of the radio channels having the radio wave intensity in the predetermined number is not reached, the base station may automatically activate.

Now, description will be made about a third embodiment of the method of automatic matching for radio channels by a base station according to the present invention.

The base station transmits the information of the near-by base station table 123 to the near-by base stations (seventh means), and collects the number of the near-by base stations in the network (F3 in FIG. 4) (eighth means), which is then written in the network table 121. The base station further performs receiving operation for the preset period of time, and creates a connection system table (not shown) with the received base station information as the network table 121. The base station transmits the information of the created network table 121 to the near-by base stations during data transmitting/receiving period (S2 in FIG. 5) (F6 and F7 in FIG. 4). The base station sorts the received network table 121 by the MAC address, compares the connection system with the number of near-by base stations (Y12 in FIG. 9) by an ID indicating a mutually connected area of the base station communication such as the SSID value (Y7 in FIG. 9) or the like, and creates a spider-web like wiring diagram of the network table 121.

In addition, the base station automatically creates a wiring diagram, and compares the number of the near-by base stations of an arbitrary base station, for example, of the self base station, from a tip end on the created wiring diagram, with the number of near-by base stations recorded in the network table 121 (F8 in FIG. 4) (ninth means). By this comparison, the base station extracts a self base station having the number of the near-by base stations in the minimum value, and determines a preset radio channel for the base station (F9 in FIG. 4) (tenth means). The base station also performs channel setting while reading the network connection system diagram (not shown). Furthermore, when another base station also has the number of the near-by base stations in the same minimum value, the base station having the larger radio wave intensity is adapted to determine the radio channel, thus preventing a collision of the transmitting signals (eleventh means). Moreover, the base station may employ a method in that the communication system is confirmed by the network connection system diagram for also confirming and maintaining the radio wave intensity by the base station unit (not shown). Alternatively, the base station may employ a method for automatically stopping transmission of the smaller one of the MAC addresses, when the electric field intensity is the same, to automatically constitute the whole connection system (not shown).

When another base station has the same number of the near-by base stations, the base station may be adapted to determine a base station, having a smaller MAC address or smaller SSID value, not limiting to one having a larger radio wave intensity, for a preset radio channel (not shown).

Next, description will be made about an operation of the third embodiment. The base station transmits the information of the near-by base station table 123 (MAC address, SSID value Y1, and channel value Y2 of the near-by base stations) to the near-by base stations, and the self base station also receives the information of the near-by base station table 123 transmitted from the near-by base stations, for the fixed period of time (F5 in FIG. 4).

Furthermore, the base station has the network table 121 having the information of the received near-by base station table 123 recorded therein, and transmits/receives the contents of the network table 121 to the near-by base stations by use of the data transmitting/receiving period for the preset period of time (S2 in FIG. 5).

Furthermore, after the preset period of time is elapsed, the base station compares the number of the near-by base stations Y4 recorded in the near-by base station table 123 of the self base station with the number of the base stations Y12 recorded in the network table 121, and, when the number of the near-by base stations Y4 of the self base station has the minimum value, determines the self base station to the preset radio channel.

As an application to the industry, when a plurality of base stations have the number of the near-by base stations in the same minimum value, a base station having the larger radio wave intensity determine the radio channel or a base station having the smaller MAC address may determine the radio channel. Alternatively, a base station having smaller SSID value may determine the radio channel.

The network table 121 may include the near-by base station table 123. However, information distinguishing the near-by base stations from other base stations is described (Y11 in FIG. 9). The near-by base stations and other base stations may be distinguished by the radio wave intensity (Y9 in FIG. 9).

A fourth embodiment of the method of automatic matching for radio channels by a base station according to the present invention will be described.

The base station which determined the radio channel in the third embodiment has a field (Y6 in FIG. 8) in the near-by base station table 123 to record whether the radio channel is determined or undetermined. The base station also defines to notify a channel determining bit S6 in the reserve bit S4 of the capability information S3 of the beacon signal S1 (F12 in FIG. 4). Furthermore, the base station refers to the near-by base station table 123, transmits the channel determining right to one of the near-by base stations which also has the smaller number of the near-by base stations (F12 in FIG. 4) and records the determination of the radio channel in the near-by base station table 123 (not shown).

Notification of the channel determining right is not limited to the base station having the smaller number of the near-by base stations, but it may also be made to the base station having the larger number of the near-by base stations. Alternatively, the near-by base station to which the channel determining right is to be notified may be determined by the magnitude of the MAC address or SSID value.

The transmission of the channel determining bit (S6 in FIG. 5), and the transmission of the notice of the channel determining right may be made not only to the wireless LAN but also to the cable LAN. Moreover, an insertion position of the channel determining bit (S6 in FIG. 5) is not limited to the reserve bit (S4 in FIG. 5) in the beacon signal S1, and it may be inserted in another position, and alternatively the channel determination may be notified by a communication frame of a preset specific header.

The base station analyses a bit of the preset predetermined portion of the received beacon signal S1, and, when the channel determining bit S6 is detected, records the channel determination in the near-by base station table 123 corresponding to the base station transmitted the beacon signal S1.

Furthermore, when the channel determining right is notified, the base station refers to the value of the channel determining field (Y5 in FIG. 8) of the near-by base station table 123, and transmits the value to the base station of which channel is undetermined.

Advantages of the fourth embodiment of the present invention are as following. By referring to the field (Y5 in FIG. 8) where the determination or non-determination of the channel recorded in the near-by base station table 123 is written, judgement can be made whether or not the channels of the near-by base stations are determined. By this judgement, the base station which performs the next channel determination can be automatically specified. Moreover, by notifying one of the near-by base stations of the channel determining right, the path for the channel determination is limited to one, thus a collision in the channel determination can be prevented.

A fifth embodiment of the method of automatic matching for radio channels by a base station according to the present invention will be described.

The base station creates tree, topology (refer FIG. 11) of the near-by base stations according to the number of the near-by base stations in a tree structure of a spanning tree. Then, the channel automatic setting process starts using a base station which has the youngest MAC address at the tip end of the spanning tree as the starting point of the channel determining process. The base station used as the starting point sets an own radio channel (not shown), and notifies the next channel setting base station of the next setting radio channel (not shown).

The fifth embodiment of the present invention has the following advantage. Namely, in a wireless LAN having base stations provided such that any beacon signal of the respective near-by base stations cannot be received, the channel setting process is started using a tip end of a spanning tree as the starting point, enabling automatic setting of a radio channel.

A sixth embodiment of the method of automatic matching for radio channels by a base station according to the present invention will be described.

The base station detects a channel determining bit (S6 in FIG. 5) of a received beacon signal (S1 in FIG. 5) (not shown). Furthermore, the base station has a determining channel list 122 in which radio channels determined by the near-by base stations are recorded. The base station records the channel value of the beacon signal S1 in the determining channel list 122 (not shown), when the channel determining bit S6 is detected in the received beacon signal S1.

When the self base station is undetermined of a radio channel, the base station determines a radio channel which is not coincided on the determining channel list 122 and is in the nearest band, and performs the determination notification and the determining right notification to the near-by base stations in the methods shown in the above-described second and third embodiments.

For example, when the channels CH1 and CH13 are already determined, and the initial setting of the radio channel of the base station is made with the channel CH1, in the determining channel list 122, the base station sets the channel CH5 which is a radio channel of a band near to the channel CH1.

It should be noted that determination of the radio channel may be made, in addition to the above-described methods, by randomly determining the radio channels which are not coincided on the determining channel list 122.

The sixth embodiment of the present invention has the following advantage. Namely, by setting a channel in the radio channel which is not coincided on the determining channel list 122, a radio channel which does not cause a collision may be set.

A seventh embodiment of the method of automatic matching for radio channels by a base station according to the present invention will be described.

The base station refers to a predetermined field (Y5 in FIG. 8) showing channel determination of the near-by base station table 123, and when all the near-by base stations are determined of the channels, and when the channel determining right is received from a near-by base station and the radio channel of the self base station is determined, automatic matching for the channels is terminated (F16 in FIG. 4).

Moreover, the base station allocates a matching finish bit (S8 in FIG. 8) to the reserve bit S4 of the capability information S3 of the beacon signal S1 (not shown), and sets a bit showing the finish in the matching finish bit S8 simultaneously with the finish of the automatic matching for the channels (F16 in FIG. 4). For example, when the matching finish bit S8 is on a logic "1" level, this indicates the finish, and when it is on a logic "0" level, this indicates the non-finish. However, the notification of the matching finish is not limited to the method for notifying by the reserve bit S4 of the capability information S3 of the beacon signal S1.

When the matching finish bit S7 is detected from the beacon signal S1 received from a near-by base station (not shown), and a value indicating the matching finish is detected, a value indicating the finish is set in the matching finish bit S7 of the beacon signal S1 of the self base station (not shown).

When the radio channel of the self base station is undetermined and the matching finish bit S7 indicates the finish in the beacon signal S1 transmitted from the near-by base station, the base station waits for a predetermined period of time (may also be for a random period of time), and then sets a radio channel which does not collide with the near-by base stations (not shown). Furthermore, when a near-by base station still undetermined of the channel exists even after the self base station has determined the channel (Yes of F13 in FIG. 4), the base station transmits the channel determining right to the near-by base station (F14 in FIG. 4).

Advantages of the seventh embodiment of the present invention are as follows. Namely, when a plurality of base stations exist, each of the base stations having one near-by base station located at the tip end of the wireless LAN, a radio channel can also be set. Furthermore, when a new base station is added to the wireless LAN which has already finished matching, the newly added base station can automatically set a radio channel which does not collide with the radio channels of the near-by base stations.

An eighth embodiment of the method of automatic matching for radio channels by a base station according to the present invention will be described.

The base station sums up the number of the received beacon signals of the near-by base stations of respective radio frequency bands (not shown). When the number of the beacon signals does not overlap the band in the wireless LAN and exceeds the usable channel number (for example, 4), the base station is switched to a power-saving mode which only receives the beacon signal S1 (twenty-third means).

When the base station is in the power-saving mode and the number of the received beacon signals becomes the predetermined number or less, the base station automatically releases the power-saving mode, sets a radio channel which does not collide with the near-by base stations, and returns to the communication state.

It should be noted that, when the radio wave intensity of the beacon signal S1 of the near-by base station also becomes lower than the preset intensity, the base station may automatically release the power-saving mode, sets a radio channel which does not collide with the near-by base stations, and returns to the communication state.

As an application in the industry, the base station may also have an alarm notifying unit for notifying an alarm to an operator. In this case, when the number of the beacon signals of the near-by base stations in received respective radio frequency bands does not overlap the band in the wireless LAN, and exceeds the usable number, the base station can notify of the alarm by the alarm notifying unit, and expedite a change of the setting location of the base station.

A ninth embodiment of the method of automatic matching for radio channels by a base station according to the present invention will be described.

The base station carries out automatic matching for the radio channels by the methods shown in the above-described first to eighth embodiments, and simultaneously sets the SSID value of the self base station (not shown). The SSID value of the base station which firstly set the channel is made, for example, "1", and each base station which received the channel determining right notice thereafter sets a value obtained by adding a predetermined value or random value to the SSID value of the base station which transmitted the channel determining right notice as the SSID value of the self base station. Setting sequence of the SSID values may not be the same as the sequence of the automatic matching of the radio channels. For example, a preset SSID value (for example, SSID=1) is made as the start, the SSID value may be added using the beacon signal S1 by the procedure of the spanning tree to determine the SSID values of a plurality of the base stations (twenty-fourth means).

Advantages of the ninth embodiment of the present invention are as follows. Namely, the SSID values can also be automatically set simultaneously with the setting of the radio channels, thereby labors required in the initial setting can be reduced when building up a multiplicity of the base stations.

As described heretofore, according to the present invention, the radio channels are automatically matched so as to prevent the radio wave interference due to the use of the near-by radio channels, and thus the following advantages are achieved. A first advantage is that a collision of the radio channels can be avoided even without having knowledge of the wireless LAN. A second advantage is that the radio channels of all the base stations can be automatically determined, enabling workings easier.

What is claimed is:

1. A wireless LAN base station provided so as to compose a wireless LAN in each of cells of a service area composed of a plurality of the cells, comprising:
    first means for performing active scanning stipulated by the IEEE 802.11(b) for a previously selected period of time,
    second means for recording the number of near-by base stations in a network table from beacon signals received by respective frequency bands,
    third means for redefining said number of the near-by base stations in a reserve bit of capability information of the beacon signal transmitted by a self base station, and
    fourth means for notifying said number of the near-by base stations of said redefined number of base stations by a preset radio channel for a fixed period of time.

2. The wireless LAN base station according to claim 1, further comprising:
    fifth means for recording the radio wave intensity, radio channel, and MAC address of the received beacon signal in said near-by base station table, and
    sixth means for referring to said reserve bit of said capability information, and recording said number of the near-by base stations in a near-by base station table.

3. The wireless LAN base station according to claim 2, further comprising:

seventh means for transmitting the information of said near-by base station table to the near-by wireless LAN base stations, eighth means for collecting the number of the near-by base stations in said wireless LAN, a network table having said collected number of the near-by base stations in the wireless LAN written therein, ninth means for comparing the numbers of the near-by base stations of respective wireless LAN base stations in said network table, after a preset period of time is elapsed, and tenth means, when a wireless LAN base station having the number of said near-by base stations in the minimum value is the self wireless LAN base station, for determining the pertinent self wireless LAN base station for a preset radio channel.

4. The wireless LAN base station according to claim 3, further comprising:

eleventh means in that, when a plurality of the LAN base stations have the number of the near-by base stations in the same minimum value, the wireless LAN base station having larger radio wave intensity determines the radio channel, and twelfth means in that, when said radio wave intensity is also coincided in addition to said number of the near-by base stations, the wireless LAN base station having a smaller MAC address determines the radio channel.

5. The wireless LAN base station according to claim 1, further comprising:

thirteenth means for summing up the number of SSID values from the received beacon signals, and fourteenth means for making the number of the summed SSID values as the number of said near-by base stations.

6. The wireless LAN base station according to claim 4, further comprising:

fifteenth means, when said radio channel is determined, for defining and notifying a channel determining bit in said reserve bit of the capability information of said beacon signals, and sixteenth means for referring to said near-by base station table, and notifying the channel determining right to one of the near-by wireless LAN base stations, which also has the smaller number of said near-by base stations.

7. The wireless LAN base station according to claim 6, further comprising:

seventeenth means for creating tree topology of the near-by wireless LAN base stations according to the number of said near-by base stations in a spanning tree structure, and eighteenth means for notifying a wireless LAN base station having the youngest MAC address at the tip end of said spanning tree of said channel determination.

8. The wireless LAN base station according to claim 6, further comprising:

nineteenth means, when said channel determining bit is detected in the received beacon signal and the channel determination is detected, for creating a determining channel list having the determined radio channel written therein.

9. The wireless LAN base station according to claim 8, further comprising:

twentieth means, when said channel determining bit is detected in the received beacon signal and the channel determination is detected, and when the self wireless LAN base station is undetermined of the radio channel, for determining a radio channel which is not coincided on said determining channel list and is in the nearest band, and twenty-first means for performing the determination notification and determining right notification to the near-by wireless LAN base stations.

10. The wireless LAN base station according to claim 9, further comprising:

twenty-second means, when the determination notices are received from all the near-by wireless LAN base stations, and the self wireless LAN base station is also determined of the radio channel, for terminating automatic matching of the channels.

11. The wireless LAN base station according to claim 4, further comprising:

twenty-third means, when the number of the near-by base stations of said wireless LAN base station exceeds the usable number of channels of which bands do not overlap in said wireless LAN, for switching said wireless LAN base station to a power-saving mode.

12. The wireless LAN base station according to claim 7, further comprising:

twenty-fourth means for making the preset point expressed by SSID=1 as the starting point adding the SSID values in the procedure of a spanning tree using the beacon signals, and determining the SSID values of a plurality of the wireless LAN base stations.

13. Method of carrying out automatic matching for radio channels in a wireless LAN, said wireless LAN comprising a wireless LAN base station in each of cells of a service area composed of a plurality of the cells, comprising steps of:

performing active scanning stipulated by the IEEE 802.11 (b) for a previously selected period of time, recording the number of near-by base stations in a network table from beacon signals received by respective frequency bands, redefining said number of the near-by base stations in a reserve bit of capability information of the beacon signal transmitted by a self base station, and notifying said number of the near-by base stations of said redefined number of base stations by a preset radio channel for a fixed period of time.

* * * * *